US012781698B2

(12) United States Patent
Parr et al.

(10) Patent No.: US 12,781,698 B2
(45) Date of Patent: Nov. 3, 2026

(54) FUEL SYSTEM WITH SELF-OPTIMIZING FUEL CONTROL VALVE

(71) Applicant: Deere & Company, Moline, IL (US)

(72) Inventors: Joel D. Parr, Hudson, IA (US); Mark R. Stocker, Cedar Falls, IA (US); Joshua M. Dawkins, Holland, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/062,560

(22) Filed: Feb. 25, 2025

(65) Prior Publication Data

US 2026/0251111 A1 Aug. 27, 2026

(51) Int. Cl.

| | |
|---|---|
| ***F02M 59/46*** | (2006.01) |
| ***F02D 41/38*** | (2006.01) |
| ***F02M 55/02*** | (2006.01) |
| ***F02M 59/20*** | (2006.01) |

(52) U.S. Cl.

CPC ....... *F02M 59/466* (2013.01); *F02D 41/3845* (2013.01); *F02M 55/025* (2013.01); *F02M 59/20* (2013.01); *F02D 2200/021* (2013.01); *F02D 2200/0602* (2013.01); *F02D 2200/101* (2013.01)

(58) Field of Classification Search

CPC .... F02M 59/466; F02M 55/025; F02M 59/20; F02M 59/205; F02M 59/46; F02M 59/462; F02M 59/468; F02M 59/366; F02M 59/368; F02D 41/3845; F02D 41/226; F02D 41/227; F02D 2200/021; F02D 2200/0602; F02D 2200/101

See application file for complete search history.

(56) References Cited

U.S. PATENT DOCUMENTS

| | | | | |
|---|---|---|---|---|
| 6,343,588 B1 * | 2/2002 | Onishi | ................ | F02M 59/466 123/506 |
| 7,025,044 B1 * | 4/2006 | Breeden | ................ | F02M 59/08 137/12 |

(Continued)

FOREIGN PATENT DOCUMENTS

| | | | | |
|---|---|---|---|---|
| CN | 1055745 C * | 8/2000 | ............. | F02M 41/04 |
| CN | 101440765 A * | 5/2009 | ......... | F02M 63/0225 |

(Continued)

*Primary Examiner* — Hung Q Nguyen

(74) *Attorney, Agent, or Firm* — KLINTWORTH & ROZENBLAT LLP

(57) ABSTRACT

A fuel system for an engine of a work vehicle is disclosed. The fuel system includes a fuel rail coupled to fuel injectors, a fuel pump delivering pressurized fuel to the fuel rail, a control valve configured to control flow through the fuel pump, and a controller coupled to the sensor arrangement and the control valve. The controller having processing and memory architecture executing logic commands to control the control valve to assess the rail pressure and the engine speed to threshold values, operate the control valve to seat or unseat the valve head of the control valve to initiate and sustain delivery of pressurized fuel from the fuel pump to the fuel rail at a normal operating pressure above 10,000 psi during a normal operation, and cycle the control valve to repeatedly seat and unseat the valve head in succession during a subnormal operation.

20 Claims, 9 Drawing Sheets

(56) References Cited

U.S. PATENT DOCUMENTS

| | | | | |
|---|---|---|---|---|
| 2003/0084871 | A1* | 5/2003 | Uchiyama | F02D 41/3845 123/396 |
| 2008/0025849 | A1* | 1/2008 | Okamoto | F02D 41/3845 417/213 |
| 2012/0073546 | A1* | 3/2012 | Blom | F02M 37/0052 123/495 |
| 2014/0379238 | A1* | 12/2014 | Riepl | F02M 63/028 701/103 |
| 2019/0211788 | A1* | 7/2019 | Kodama | F02M 59/36 |
| 2025/0215836 | A1* | 7/2025 | Suzuki | F02M 21/0206 |

FOREIGN PATENT DOCUMENTS

| | | | | | |
|---|---|---|---|---|---|
| CN | 105339621 | A | * | 2/2016 | F02D 41/221 |
| CN | 118934376 | A | * | 11/2024 | F04B 49/06 |
| DE | 102006000483 | A1 | * | 4/2007 | F02D 41/3845 |
| DE | 102007061228 | A1 | * | 6/2009 | F02D 41/221 |
| DE | 102015212428 | A1 | * | 1/2017 | F02D 41/22 |
| DE | 102016207053 | A1 | * | 10/2017 | F02D 41/3845 |
| DE | 102016209000 | A1 | * | 11/2017 | F04B 7/0076 |
| DE | 112016004671 | T5 | * | 6/2018 | F02M 59/466 |
| EP | 244340 | A | * | 11/1987 | |
| EP | 1013922 | A2 | * | 6/2000 | F04B 7/0076 |
| EP | 2230398 | A1 | * | 9/2010 | F02D 41/062 |
| EP | 2241744 | A1 | * | 10/2010 | F02M 59/02 |
| EP | 2716902 | A1 | * | 4/2014 | F16K 31/0696 |
| EP | 3358175 | A1 | * | 8/2018 | F02D 41/3845 |
| JP | 2000511992 | A | * | 9/2000 | F02M 59/366 |
| JP | 3794205 | B2 | * | 7/2006 | F02M 59/367 |
| JP | 2007327404 | A | * | 12/2007 | F02D 41/3854 |
| JP | 2009138593 | A | * | 6/2009 | F02D 41/3845 |
| WO | WO-2008001176 | A2 | * | 1/2008 | F02D 41/3094 |
| WO | WO-2013006238 | A2 | * | 1/2013 | F02D 41/2464 |
| WO | WO-2015015723 | A1 | * | 2/2015 | F02M 63/0049 |

* cited by examiner

FUEL SYSTEM WITH SELF-OPTIMIZING FUEL CONTROL VALVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to fuel pumps control valves for maintaining optimum performance of the fuel pumps.

BACKGROUND OF THE DISCLOSURE

Many work vehicles are powered by internal combustion engines. These engines include piston-cylinder arrangements that operate to cause combustion events. The fuel for these combustion events may be pumped to the engine by a fuel pump. The amount of fuel pumped for the combustion events is precisely controlled to keep the engine running efficiently and to control emissions. Suboptimal operation of the fuel pump may adversely affect emissions or efficient operation of the engine.

SUMMARY OF THE DISCLOSURE

In one implementation, a fuel system for an engine of a work vehicle is disclosed. The fuel system includes a fuel rail to which are coupled fuel injectors that are in turn coupled to the engine, a fuel pump delivering pressurized fuel to the fuel rail to be distributed to the fuel injectors, and a sensor arrangement including a pressure sensor detecting a rail pressure at the fuel rail and an engine sensor detecting a speed, load, or temperature of the engine. The fuel system further includes a control valve configured to control flow through the fuel pump. The control valve includes a valve body defining a flow passage upstream from the fuel rail and the pressurized fuel and leading from a valve passage that is disposed about a valve axis in which is disposed a valve head. The valve head configured to seat against the valve body to close off the flow passage. The control valve further includes a valve actuator coupled to the valve body and controllable to move the valve head along the valve axis to seat or unseat the valve head. The fuel system further includes a controller coupled to the sensor arrangement and the control valve. The controller having processing and memory architecture executing logic commands to control the control valve to assess the rail pressure and the engine speed, load, or temperature relative to threshold values. The controller having processing and memory architecture executing logic commands to further control the control valve to operate the control valve to seat or unseat the valve head of the control valve to initiate and sustain delivery of the pressurized fuel from the fuel pump to the fuel rail at a normal operating pressure above 10,000 psi during a normal operation of the engine as determined by the controller based on the assessment of the rail pressure and the engine speed, load, or temperature. The controller having processing and memory architecture executing logic commands to further control the control valve to cycle the control valve to repeatedly seat and unseat the valve head in succession during a subnormal operation of the engine as determined by the controller based on the assessment of the rail pressure and the engine speed, load, or temperature.

In an example of the fuel system, cycling the control valve to repeatedly seat and unseat the valve head comprises repeatedly moving the valve head through its full range of motion. In a further example of the fuel system, the control valve actively seats the valve head against the valve body to close off the flow passage and passively unseats the valve head to open flow passage through the valve body.

In a further example of the fuel system, the control valve includes a spring positioned against the valve head, wherein the spring applies a biasing force to the valve head to unseat the valve head, and wherein the valve actuator overcomes the biasing force to seat the valve head and close off the flow passage. In a further example of the fuel system, the valve actuator includes a solenoid including an armature. The armature is movable from a first position to a second position. Moving from the first position to the second positioned causes the armature to press against the valve head. In the second position, the armature moved the valve head to seat the valve head. Positioning the armature in the first position allows the spring to move the valve head and unseat the valve head.

In a further example of the fuel system, cycling the control valve to repeatedly seat and unseat the valve head includes supply a maximum current to the valve actuator for a first threshold time period. The valve head is moved to seat the valve head during the first threshold time period. Cycling the control valve to repeatedly seat and unseat the valve head further includes suppling a minimum current to the valve actuator for a second threshold time period. The valve head is moved to unseat the valve head during the second threshold time period.

In a further example of the engine, cycling the control valve to repeatedly seat and unseat the valve head includes cycling the valve head through its full range of motion a threshold number of times. In a further example of the fuel system, cycling the control valve to repeatedly move the valve head within the valve body to seat and unseat the valve head is configured to remove debris built up on the valve head. In a further example of the fuel system, wherein debris removed from within the control valve is deposited within the fuel system before reaching the injectors. In a further example of the fuel system, the thresholds comprise an engine speed threshold of zero.

In one implementation of an engine of a work vehicle. The engine includes a plurality of fuel injectors, a fuel rail coupled to the plurality of fuel injectors, and a fuel pump delivering pressurized fuel to the fuel rail to be distributed to the fuel injectors. The engine further includes a sensor arrangement including a pressure sensor detecting a rail pressure at the fuel rail and an engine sensor detecting a speed, load, or temperature of the engine. The engine includes a control valve configured to control flow through the fuel pump. The control valve includes a valve body defining a flow passage upstream from the fuel rail and the pressurized fuel and leading from a valve passage that is disposed about a valve axis in which is disposed a valve head. The valve head is configured to seat against the valve body to close off the flow passage. The control valve further includes a valve actuator coupled to the valve body and controllable to move the valve head along the valve axis to seat or unseat the valve head. The engine includes a controller coupled to the sensor arrangement and the control valve. The controller having processing and memory architecture executing logic commands to control the control valve to assess the rail pressure and the engine speed, load, or temperature relative to threshold values. The controller having processing and memory architecture executing logic commands to further control the control valve to operate the control valve to seat or unseat the valve head of the control valve to initiate and sustain delivery of the pressurized fuel from the fuel pump to the fuel rail at a normal operating pressure above 10,000 psi during a normal operation of the engine as determined by the controller based on the assessment of the rail pressure and the engine speed, load, or temperature. The controller having processing and memory architecture executing logic commands to further control the control valve to cycle the control valve to repeatedly seat and unseat the valve head in succession during a subnormal operation of the engine as determined by the controller based on the assessment of the rail pressure and the engine speed, load, or temperature.

In an example of the engine, cycling the control valve to repeatedly seat and unseat the valve head comprises repeatedly moving the valve head through its full range of motion. In a further example of the engine, the control valve actively seats the valve head against the valve body to close off the flow passage and passively unseats the valve head to open flow passage through the valve body.

In a further example of the engine, the control valve includes a spring positioned against the valve head. The spring applies a biasing force to the valve head to unseat the valve head. The valve actuator overcomes the biasing force to seat the valve head and close off the flow passage. In a further example of the engine, the valve actuator includes a solenoid including a armature. The armature is movable from a first position to a second position. Moving from the first position to the second positioned causes the armature to press against the valve head. In the second position, the armature moved the valve head to seat the valve head. Positioning the armature in the first position allows the spring to move the valve head and unseat the valve head.

In a further example of the engine, cycling the control valve to repeatedly seat and unseat the valve head includes supplying a maximum current to the valve actuator for a first threshold time period. The valve head is moved to seat the valve head during the first threshold time period. Cycling the control valve to repeatedly seat and unseat the valve head further includes supplying a minimum current to the valve actuator for a second threshold time period. The valve head is moved to unseat the valve head during the second threshold time period.

In a further example of the engine, cycling the control valve to repeatedly seat and unseat the valve head includes cycling the valve head through its full range of motion a threshold number of times. In a further example of the engine, cycling the control valve to repeatedly move the valve head within the valve body to seat and unseat the valve head is configured to remove debris built up on the valve head. In a further example of the engine, debris removed from within the control valve is deposited within the fuel system before reaching the injectors. In a further example of the engine, the engine speed threshold is zero.

Figure 1:
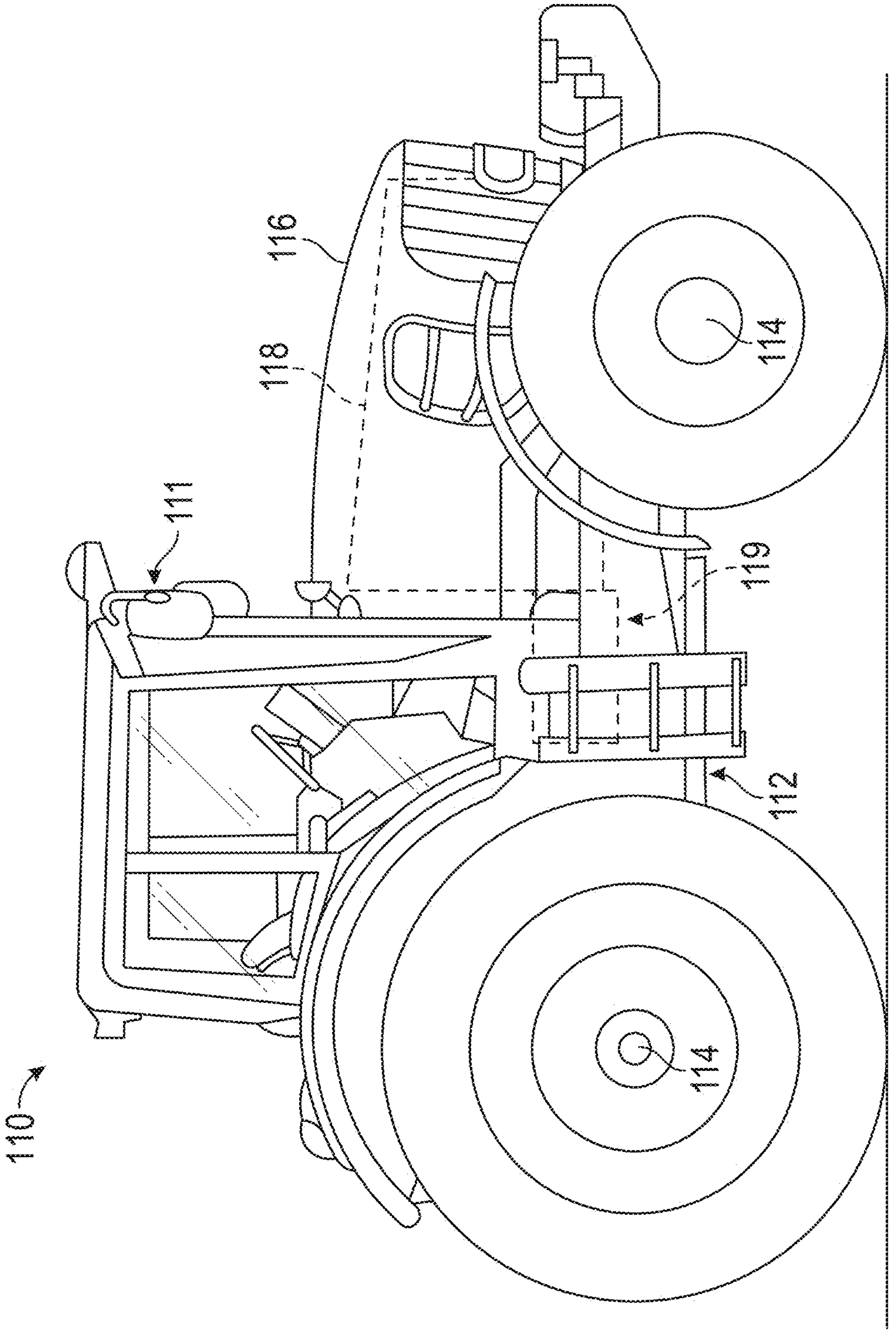
FIG. 1 is a simplified perspective view of an example engine for a work vehicle in which the present disclosure may be incorporated.

Throughout the drawings, identical reference numbers designate the same element. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Example embodiments of the present disclosure are shown in the accompanying figures of the drawings described briefly above. Various modifications to the example embodiments may be contemplated by one of skill in the art without departing from the scope of the present invention, as set forth in the appended claims.

Overview

Many work vehicles are powered by internal combustion engines. These engines include multiple piston-cylinder arrangements that operate to cause combustion events. The fuel for these combustion events may be pumped to the engine by a fuel system having a fuel pump. The amount of fuel pumped to the engine for the combustion events is precisely controlled to keep the engine running efficiently and control emissions. Overtime, the fuel pumps commonly lose control precision and response due to a build up of deposits within the fuel pump. The deposits may build up from a variety of reasons including the use of low quality fuel. The build up of deposits from low quality fuel may be caused by oxidation deterioration, high metal content Zn, Mg, Ca, Na+K, high ambient fuel temperatures, microbial growth, some fuel additives for anti-foam and cold filter plugging point enhancers (CFPP), etc. The performance, efficiency, and soot/Nitrogen oxides (Nox) emissions may be due to poor transient rail pressure control in the fuel system of the engine due to the build up of these debris deposits.

The build up of deposits may occur in the suction control valve within the fuel pump. The build up may occur here due to this being a location of small clearances where debris that gets past a fuel filter may build up to form debris deposits. The loss of precision control occurs from the build up within the suction control valve causing additional friction for the valve to open and close. There are some algorithms that attempt to compensate for the impaired performance due to the debris build up by augmenting the suction control valve command during operation. For example, if an absolute overshoot of rail pressure is predicted, the control may actively increase the current command by an open loop offset in a short burst to attempt to close the valve faster than the normal operating command. This compensation may be applied when rail pressure exceeds min/max thresholds, or the rail pressure is projected to exceed min/max thresholds. While this algorithm attempts to compensate for the reduced performance, it does not actively attempt to clear the cause of the additional friction. These kinds of algorithms being introduced during operation can cause control instability and add complexity to tuning the entire system. As such, there is a need for a way to clear the debris deposits and bring precision control back to the fuel pump.

The present disclosure provides a fuel system for an engine for a work vehicle, where a controller of the fuel system operates the engine under normal operating conditions and performs a cycling operation to maintain the engine in optimal performance. The high-pressure fuel system having a fuel pump configured to pump an incompressible fuel through a suction control valve to a suction valve and then to a fuel rail that distributes the incompressible fuel to fuel injectors of the engine. The suction control valve controls flow of the incompressible fuel through the fuel pump. The suction control valve includes a valve body defining a flow passage upstream from the fuel rail and the pressurized fuel. The valve body defines a valve passage that is disposed about a valve axis and a valve head is disposed within the valve passage along the valve axis. The valve head configured to seat against the valve body to close off the flow passage. The control valve also includes a valve actuator coupled to the valve body and controllable to move the valve head along the valve axis to seat or unseat the valve head. The fuel system further includes engine sensors configured to collect data indicative of a speed, a temperature, a load, and/or a temperature of the engine. The control system further includes a rail pressure sensor configured to collect data indicative of a rail pressure. The controller is coupled to these sensors (i.e., engine sensors and rail pressure sensor) and controls the fuel system to operate the engine based on data from the sensors and input from a user interface. The controller also at times performs a cycling operation of the suction control valve to maintain the engine in optimal performance.

The controller includes a processor and memory architecture executing control logic to operate the engine under normal operating conditions and at times perform a control valve cycling operation to maintain the engine in optimal performance. The control valve cycling operation may be performed when the rail pressure is less than a rail pressure threshold and the engine speed is less than an engine speed threshold. These thresholds are in place to ensure that the control valve cycling would not be performed during normal operation and affect the operation of the work vehicle. For example, the cycling operation may be performed at the shutdown of the engine or before the startup of the engine. The cycling operation may not be performed at each shutdown/startup and may be performed at a shutdown/startup after a time period has elapsed since the last performed cycling operation.

The control valve cycling operation includes the controller quickly cycling the suction control valve to and from a fully open position to fully closed position, where a valve head of the suction control valve is unseated and seated repeated. For example, the control valve cycling operation may be performed by cycling the valve head between a maximum and minimum flow/position for a specified amount of time. The specified amount of time may be determined to ensure that valve head had enough time to move from the open/closed position to the closed/open position. The cycling motion of the valve head may move the valve head outside its normal range of motion during engine operation which helps to free debris stuck on the valve head. For example, debris stuck on the valve head and positioned between the valve head and the valve body. The debris may then exit the suction control valve and end up being deposited within the fuel rail. The debris may be safely deposited there since the debris itself is small and will not obstruct the fuel through the fuel rail. There is also a filter between the fuel rail and each injector where the debris may be caught if the debris does not get deposited within the fuel rail.

The cycling operation clears the built up debris by rapidly cycling it and thereby returns the control valve to normal performance and operation. In many aspects, the suction control valve is a solenoid operated valve. The cycling operation rapidly shifts the solenoid armature between its end ranges of travel. Sudden movement of the solenoid armature is necessary to dislodge the debris from the control valve. This approach is advantageous compared to only attempting to compensate for the debris because it clears the debris directly relieving the source of additional friction as opposed to compensating for the performance impact. By clearing the debris the suction control valve should return to normal operation without any intervention or impact on controls during engine operation. The cycling operation guarantees that the suction control valve will be cycled regardless of application and operation cycles. For example, during normal operation of the engine, the suction control may not be cycled quickly through its full range of motion and as such the debris is not removed. Additionally, the cycling algorithm can be performed quickly and as such be performed at each engine shutdown. So there never needs to be a build up of debris deposits within the suction control valve. In an alternative aspect, the cycling operation may be performed after a period of operational time has elapsed. For example, the cycling operation may be performed during the next shutdown after 10 hours of operation had occurred.

Several constraints may be applied to when the cycling operation is to be performed to prevent component damage. To limit the components maximum exposure to the cycling operation, a maximum number of cycles may be performed each time the cycling operation is performed. The cycling operation may only be performed at or after engine shutdown or before engine start up to ensure that normal engine operation is not impacted. While active, the controller may monitor the rail pressure and the engine sensors stop the cycling operation if the rail pressure exceeds or reaches a rail pressure threshold or the engine sensors exceeds an engine sensor threshold (e.g., engine speed threshold). In one aspect, the rail pressure threshold may be selected to be low enough to not cause large pressure spikes in the fuel rail during the cycling operation. In an alternative aspect, the rail pressure threshold may be a function of the engine speed. In one aspect, an engine speed threshold may be selected to be zero. This would ensure that there is no pressure built in the fuel rail during the valve being in the max open position since fuel is not being pumped in. In an alternative aspect, the engine speed threshold may be selected to be non-zero and a value that would not cause pressure to build in the fuel rail. As such, with a non-zero engine speed threshold, the cycling operation may be performed during a shutdown with the engine still running, which may provide the benefit of having fuel flowing through the control valve during the cycling operation. The moving fuel may help to remove deposits; however, engine parameters need monitored carefully to ensure that no thresholds are exceeded, and no components are damaged during the cycling operation.

If the cycling operation is being performed during an engine shutdown and the next engine start request is received, the cycling operation is stopped to ensure that there is no impact on engine start performance. For example, the engine speed threshold may be selected to be zero. As such, as the engine speed would increase to be non-zero during an engine start, the cycling operation would automatically stop and it would not affect the engine start performance. In an alternative aspect, the controller may receive the engine start command from a user interface and stop the cycling operation upon receiving the engine start command.

An example embodiment of a fuel system and control strategy to perform a suction control valve cycling operation is provided according to the present disclosure. The following description should be understood as merely providing one or more non-limiting examples context in which embodiments of the present disclosure may be better understood.

Example Self-Optimizing Fuel Control Valve

Referring to FIG. 1, a work vehicle 110 is shown that can implement embodiments of the disclosure. In the illustrated example, the work vehicle 110 is depicted as an agricultural tractor. It will be understood, however, that other configurations may be possible, including configurations with the work vehicle 110 as a different kind of tractor, a harvester, a log skidder, a grader, or one of various other work vehicle platforms. The work vehicle 110 includes a chassis or frame 112 carried on front and rear wheels (or tracks) 114. Positioned on a forward end region of the chassis 112 is an engine housing 116 within which is located an engine system 118. The engine system 118 includes a fuel system and provides power via an associated drivetrain 119 to an output member (e.g., an output shaft, not shown) that, in turn, transmits power to axle(s) of the work vehicle 110 to provide propulsion thereto and/or to a power take-off shaft for powering an implement on or associated with the work vehicle 110, for example.

The engine system 118 is a compression ignition internal combustion engine having an engine block with a plurality of piston-cylinder arrangements that operate to cause combustion events. There may be various numbers of piston-cylinder arrangements defined in the engine, where the number of piston-cylinder arrangements defined by the style and layout of the engine. An incompressible fuel is pumped by a fuel pump through a fuel path to reach each piston-cylinder arrangement, where the fuel is ignited to operate the work vehicle.

Figure 2:
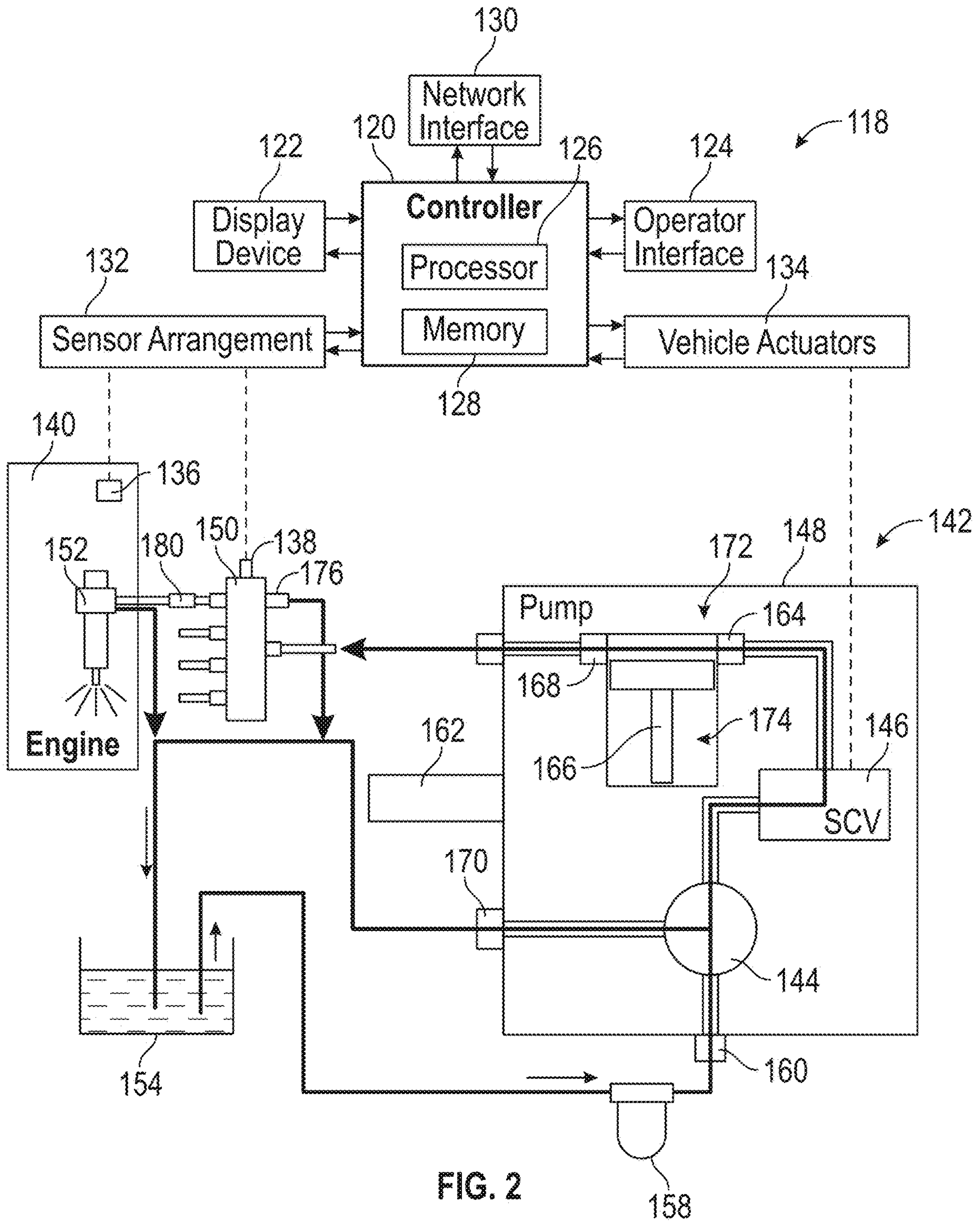
FIG. 2 is a schematic diagram of an example fuel system for the work vehicle of FIG. 1.

Referring to FIG. 2, the work vehicle may include a controller 120 to monitor parameters of the engine system 118 and work vehicle 110 as well as control the work vehicle 110 and perform operations as directed by an operator. For example, the work vehicle 110 may include an operator cabin 111 (FIG. 1) including one or more display devices 122 and any of various operator interfaces 124 coupled to a controller 120. Apart from the display devices 122, the operator interface devices 124 may include various video and audio devices for providing video and audio information, haptic devices that provide haptic feedback, levers, joysticks, steering wheels, pedals, buttons, and so on. Operator interface devices 124 can also be a set of inputs displayed on the display devices 122, for example, links, icons, or other user actuatable mechanisms. Additionally, or alternatively, some portion of the operator interfaces 124 may be integrated into the display devices 122, such that the operator interfaces 124 may include physical inputs (e.g. buttons, switches, dials, etc.) on or near the display devices 122, a touchscreen module integrated into the display devices 122, or a cursor input device (e.g., a joystick, trackball, or mouse) for positioning a cursor utilized to interface with GUI elements generated on the display devices 122. The display devices 122 can be any image-generating device configured for operation within the operator cabin, including one or more dedicated display consoles and various heads-up display projectors.

The display devices 122 and operator interfaces 124 are operatively coupled to the controller 120 with various data connections between these components representative of wired and/or wireless data connections. The controller 120 may have one or more controllers or other control architecture that can assume any form suitable for performing the functions described herein and is used in a non-limiting sense to generally refer to the processing architecture or system of the work vehicle 110 or other computing device or group of devices. For example, the controller 120 may encompass or may be corresponding to any practical number of processors, control computers, computer-readable memories, power supplies, storage devices, interface cards, and other standardized components, and may also include or cooperate with any number of firmware and software programs or computer-readable instructions designed to carry-out the various process tasks, calculations, and control/display functions described herein, all represented by a processor 126. Such computer-readable instructions may be stored within a non-volatile sector of a local onboard memory 128, which is accessible to the controller 120. While generically illustrated as a single block, the memory 128 can encompass any number and type of storage media suitable for storing computer-readable code or instructions, as well as other data utilized to support the operation of the work vehicle 110. The memory 128 may be integrated into the controller architecture in various embodiments such as, for example, a system-in-package, a system-on-a-chip, or another type of microelectronic package or module.

The controller 120 may be couped to a network interface 130 and the network interface 130 may be any device or module providing access to a network, such as a wireless (e.g., WiFi or cellular) transceiver or datalink, including an antenna. The network interface 130 may also include a satellite receiver and may receive data via a satellite link and may allow communication with nearby cellular towers or terrestrial nodes, such as wireless RF nodes included in a controller area network ("CAN") established over an agricultural area (e.g., a field or group of fields) within which the work vehicle 110 operates.

The engine system 118 includes an engine 140, a fuel system 142, a sensor arrangement 132, and vehicle actuators 134. The sensor arrangement 132 may include various different types of sensor architectures for providing the controller 120 with input pertaining to the operational parameters of the work vehicle 110 and engine 140, data pertaining to the surrounding environment of the work vehicle 110, and other such information useful to operation of the work vehicle 110. The sensor arrangement 132 includes engine sensors 136 to provide measurements indicative of the engine speed, engine load, and/or engine temperature and a fuel rail pressure sensor 138 to provide a rail pressure of the fuel system 142 of the engine 140. The sensor arrangement 132 may also include various linear and angular position sensors, a receiver chipset of the like for determining position utilizing a satellite navigation system, inertial sensors (e.g., micro-electro-mechanical system inertial measurement units "MEMS IMU" devices), strain sensors, pressure sensors, engine speed sensors, temperature sensors, moisture sensors, wear sensors, vibration sensors, image sensors or cameras, and/or sensors for measuring radio frequency (RF) signals.

The actuators 134 onboard the work vehicle 110 may assume different forms for performing functions supporting its operation. For example, the actuators 134 may serve to provide tractive force to the ground-engaging members, operate pneumatic and hydraulic systems if being used, impart linear or angular motion to work implements attached to the work vehicle, operate the fuel system 142 to control the fuel provided into the engine, and various other actions for the work vehicle 110 to function properly. The actuators 134 may take any of various forms, including various motors, pumps, linear actuators (e.g., cylinders), solenoids and other valves, clutches, brakes, and any other mechanism that may transmit power from one component to another. The actuators 134 may include mechanical, electrical, and/or hydraulic aspects and thus may be coupled to and receive power from an electrical power system of the work vehicle, where the electrical power system is powered by the engine 140. Regarding controlling the fuel in the fuel system 142, the vehicle actuators 134 include a suction control valve 146.

It should be understood that that the aforementioned sensor arrangement 132 and vehicle actuators 134 may also include any number of sensors and actuators located to sense parameters of various attachments that are propelled by the work vehicle. Such attachments may include towed implements attached to the rear of the work vehicle (e.g., various tillage equipment, balers, sprayers, windrowers, backhoes, etc.) as well as implements that attached to the front end of the work vehicle (e.g., various loaders, plows, brushes, etc.). These attachments may receive various forms of power (e.g., electric and hydraulic) so as to be a part of the electrical power system, or they may have separate self-contained power systems or be otherwise unpowered.

The controller 120 may be one or more controllers working together. For example, the controller 120 may include an engine control unit (ECU) that optimizes operation of the engine 140, an operator interface controller, a climate control system, a traction system controller, an accessory and/or hydraulic system controller, and various others. The various controllers may exchange signals and/or data therebetween as necessary to maintain efficient and clean operation of the engine system 118 (and thereby the work vehicle 110).

The controller 120 may be implemented using hardware, software, firmware, or combinations thereof. The controller 120 may be implemented by one or more suitably programmed computer-based device(s), some or each having a processing module and a memory. The memory having stored therein, among other things, programming instructions executed by one or more processing modules to cause the controller 120 to undertake functions of the engine system 118. Each computer-based device may comprise, e.g., a computer, a device using one or more application specific integrated circuits (ASIC's) and/or field-programmable gate arrays (FPGA's), and/or combinations thereof. Such devices may be unitary or may be distributed multiple computing devices, and one or more such computing devices may be installed locally on or remote from the work vehicle 110. Each computing device may communicate with another computing device over one or more network(s) such as a local area network (LAN), a control area network (CAN), a cellular network, a wide area network (WAN) such as the Internet, and the like. The controller 120 may be also coupled to and be responsive to one or more user device(s) (not shown) such as a keyboard, a mouse, a display, a touchscreen, a joystick, etc. (not shown) via which an operator may monitor and direct operation of the work vehicle 110.

The controller 120 monitors the signals or data received from the sensor arrangement 132 and adjusts operation of the engine system 118 and other components to ensure the work vehicle 110 is able to meet the demands placed on work vehicle 110 by an operator while managing efficient operation of the engine 140. For example, the controller 120 may monitor the speed, load, and/or temperature of the engine 140 from the engine sensors 136 and the fuel rail pressure from the fuel rail pressure sensor 138 to control the fuel pump 148 to supply the appropriate amount of fuel to the engine 140. Specifically, the controller 120 may control the suction control valve 146 within the fuel pump 148 to supply pressurized fuel to the fuel rail 150 for dispersion to injectors 152 positioned within the engine 140.

The fuel system 142 includes the fuel pump 148, a fuel tank 154, a fuel filter 158, the fuel rail 150, injector filters 180, and injectors 152. The fuel is pulled from the fuel tank 154 by the fuel pump 148. The fuel passes through the fuel filter 158 to remove any large debris particles and enters an inlet 160 of the fuel pump 148. The fuel pump 148 includes the inlet 160, a camshaft 162, a feed pump 144, the suction control valve 146, a suction valve 164, a plunger 166, a delivery valve 168, and a fuel overflow outlet 170. The fuel pump 148 is driven by the engine 140. The engine 140 supplies rotational power to the drivetrain 119, and the drivetrain 119 drives among other things a camshaft 162 of the fuel pump 148. The rotation of the camshaft 162 drives the feed pump 144 and plunger 166 of the fuel pump 148. The feed pump 144 is the pump that pulls fuel from the fuel tank 154 and sends the fuel through the fuel system 142 to supply fuel to the injectors 152.

The fuel enters the inlet 160 of the fuel pump 148 and passes through the feed pump 144. The fuel that exits the feed pump 144 is pumped to the suction control valve 146. The suction control valve 146 is controlled by the controller 120 to supply an appropriate amount of fuel to the fuel rail 150 to operate the engine 140. The controller 120 may control the suction control valve 146 to place the suction control valve 146 in any position from fully closed to fully open to adjust the amount of fuel that passes through the suction control valve 146. Not all the fuel being supplied by the feed pump 144 passes through the suction control valve 146 due to the opening and closing of the suction control valve 146. As such, any excess fuel pumped by the feed pump 144 may pass through an overflow outlet 170 to allow any extra fuel to be moved to the fuel tank 154. This process allows fuel to be supplied to the suction control valve 146 and any excess fuel to be passed back to the fuel tank 154.

The fuel that passes through the suction control valve 146 enters a plunger system 172. The plunger system 172 includes the plunger 166, the suction control valve 146, and the delivery valve 168. The plunger system 172 pressurizes the fuel to be greater than 10,000 psi (e.g., 29,000 psi) and supplies the high-pressure fuel to the fuel rail 150. The fuel comes from the suction control valve 146 and passes through the suction valve 164 to enter a plunger chamber 174. The suction valve 164 only allows fuel to pass into the plunger chamber 174 and prevents the fuel from passing back toward the suction control valve 146. The plunger 166 is driven by the camshaft 162 to move within the plunger chamber 174 to compress the fuel in the plunger chamber 174 and pressurize the fuel. The high-pressure fuel then exits the plunger chamber 174 through the delivery valve 168 to enter the fuel rail 150. The delivery valve 168 opens when the fuel pressure within the plunger chamber 174 exceeds a threshold. The delivery valve 168 prevents the high-pressure fuel (e.g., fuel at a pressure greater than 10,000 psi) in the fuel rail 150 from flowing back into the plunger chamber 174. The fuel that passes through the suction control valve 146 is used by the plunger system 172 to initiate and sustain delivery of pressurized fuel to the fuel rail 150.

The fuel rail 150 includes a pressure reduction valve 176 and the fuel rail pressure sensor 138. The pressure reduction valve 176 helps to reduce any excess pressure build up in the fuel rail 150. For example, if the fuel pressure at the fuel rail 150 is above a threshold value, then the pressure reduction valve 176 opens to allow some fuel to pass out of the fuel rail 150 to reduce the fuel pressure at the fuel rail 150. The fuel that passes through the pressure reduction valve 176 goes to the fuel tank 154. The fuel rail pressure sensor 138 measures the fuel pressure at the fuel rail 150 and supplies the fuel pressure to the controller 120. The high-pressure fuel in the fuel rail 150 is distributed to the injectors 152 in the engine 140. Each fuel path from the fuel rail 150 to an injector 152 passes through an injector filter 180. The high-pressure fuel passes through the injector filter 180 to filter out any remaining debris particles above a threshold size (e.g., 60 microns) before reaching the injector 152. The high-pressure fuel passes through the injectors 152 to enter a piston-cylinder arrangements in the engine 140. Combustion events occur in the piston-cylinder arrangements igniting the fuel in the piston-cylinder arrangements to drive the engine 140. As shown in FIG. 2, any excess fuel at an injector 152 that does not enter a piston-cylinder arrangement goes back to the fuel tank 154.

Figure 3A:
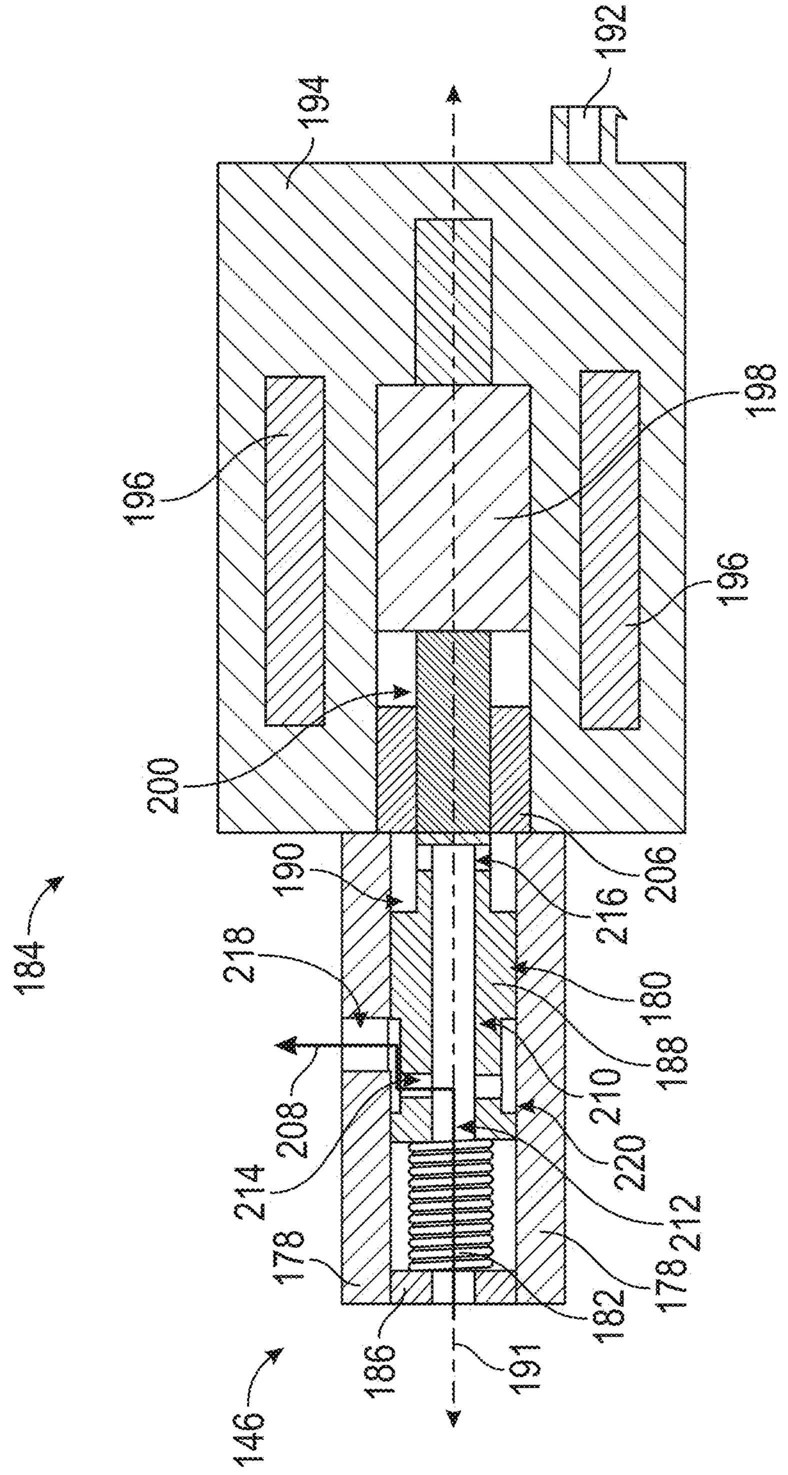
FIGS. 3A and 3B are simplified cross-sections of an example suction control valve of the fuel system of FIG. 2.
Figure 3B:
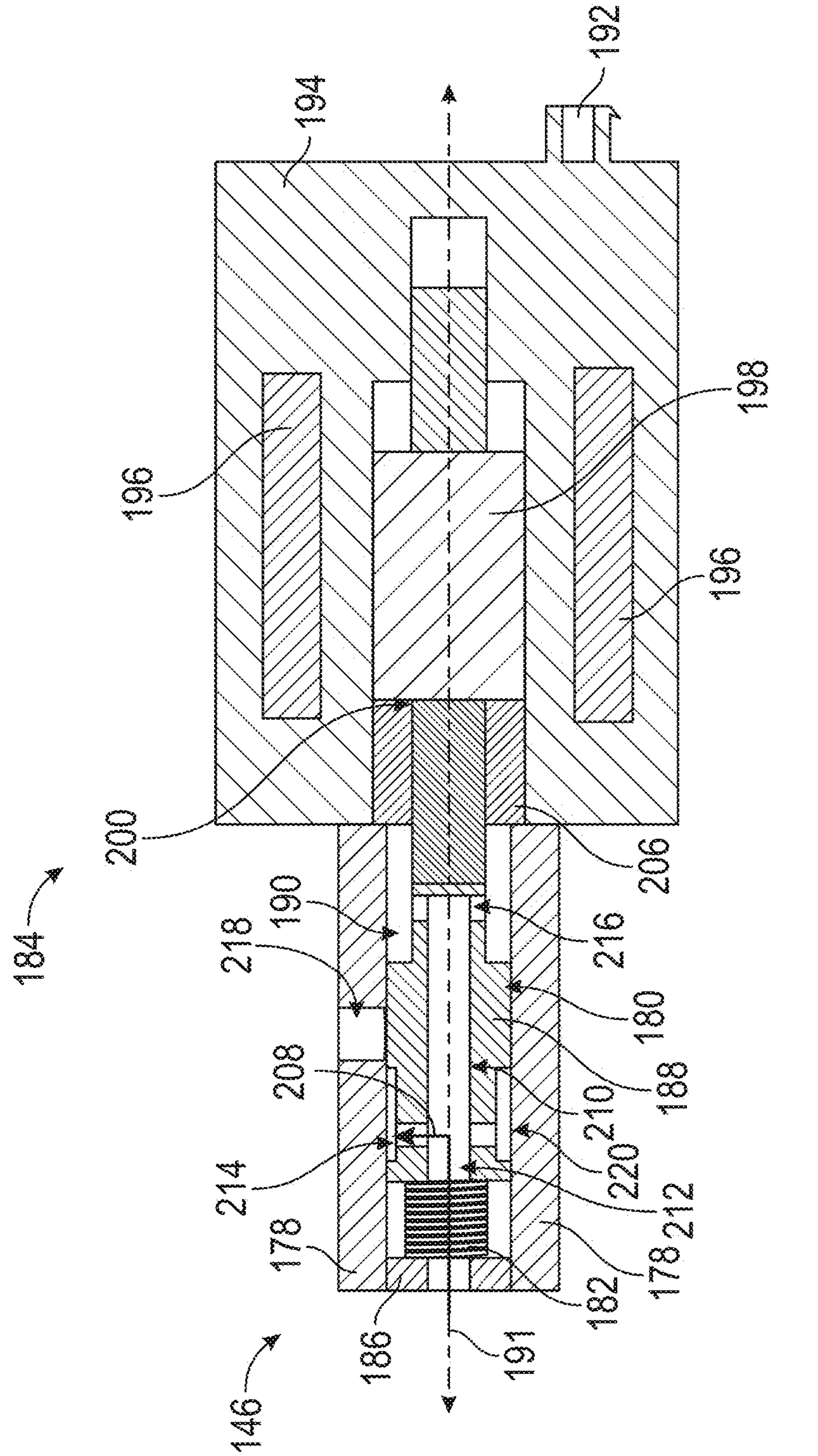

Referring also to FIGS. 3A and 3B, the suction control valve 146 includes a valve body 178, a valve head 188, a spring 182, a valve actuator 184, and a valve end cap 186. The valve body 178 defines a valve passage 190 defining a valve axis 191. The valve head 188 tightly fits inside of the valve passage 190 and may seal against the valve passage 190. The valve body 178 defines a fuel flow passage 208 that allows fuel to flow through the suction control valve 146. The valve head 188 is moveable within the valve passage 190 to control the flow of fuel through the fuel flow passage 208. The valve head 188 is moveable from a fully open position shown in FIG. 3A to a fully closed position shown in FIG. 3B. In the fully closed position, the valve head 188 is seated against the valve body 178 within the valve passage 190 to close off the fuel flow passage 208.

The valve head 188 is driven by the valve actuator 184. In at least one aspect, the valve actuator 184 is a solenoid including an electrical connector 192, a housing 194, a coil 196, an armature 198, and an end cap 206. The controller 120 may connect to the valve actuator 184 at the electrical connector 192 and power is supplied to the valve actuator 184 through the electrical connector 192. The housing 194 defines an internal channel 200. The coil 196 is wrapped around to surround the internal channel 200. The armature 198 is positioned within the internal channel 200. The end cap 206 positioned to close the open end of the internal channel 200. The armature 198 passes through the end cap 206.

The power (i.e., current) supplied to the valve actuator 184 through the electrical connector 192 may be used to power the coil 196 to generate a magnetic field that moves the armature 198 out of the housing 194. The armature 198 is moveable from a first position to a second position. In the first position, the armature 198 is positioned entirely within the housing 194 as shown in FIG. 3A. In the second position, a maximum amount of the armature 198 extends out of the housing 194 as shown in FIG. 3B. The controller 120 may supply current to valve actuator 184 that powers the coil 196 to move the armature 198 toward the second position.

The valve body 178 is positioned against the housing 194 such that the armature 198 may exit the housing 194 and enter the valve passage 190 to press against and move the valve head 188 toward the fully closed position. An end cap 186 is positioned at the end of the valve passage 190 opposite the valve actuator 184 to close the end of the valve passage 190. The spring 182 is positioned between the end cap 186 and the valve head 188. The valve head 188 is moveable within the valve passage 190 along the valve axis 191 from the fully open position to the fully closed position. The spring 182 supplies a biasing force on the valve head 188 pressing the valve head 188 toward the fully open position.

The controller 120 controls the position of the valve head 188 by controlling the current supplied to the valve actuator 184. The current supplied to the valve actuator 184 causes the armature 198 to move toward the second position and press against the valve head 188. The armature 198 must press the valve head 188 with enough force to overcome the biasing force from the spring 182 to move the valve head 188 toward the fully closed position. In the second position of the armature 198, the spring biasing force is overcome and the valve head 188 is in the fully closed position with the valve head 188 seated against the valve body 178 closing off the fuel flow passage 208. When the controller 120 stops supplying current to the to the valve actuator 184, the biasing force from the spring 182 unseats the valve head 188 and moves the valve head 188 toward the fully open position. As the spring 182 moves the valve head 188 toward the fully open position, the valve head 188 presses against the armature 198 moving the armature 198 toward the first position. As such, the suction control valve 146 actively seats the valve head 188 against the valve body 178 to close off the fuel flow passage 208 and passively unseats the valve head 188 to open fuel flow passage 208 through the valve body 178.

The fuel enters the suction control valve 146 through the end cap 186. The fuel fills the valve passage 190 on either side of the valve head 188. The valve head 188 defines a valve head passage 210 through the valve head 188. The valve head passage 210 includes an inlet opening 212, a first plurality of openings 214, and a second plurality of openings 216. The fuel enters the valve head passage 210 through the inlet opening 212. The fuel may flow through the valve head passage 210 and exit through the first plurality of openings 214 when the valve head 188 is not in the fully closed position and as such is not seated against the valve body 178 shutting off the fuel flow passage 208, as shown in FIG. 3A. When the valve head 188 is not in the fully closed position, the fuel may flow along the fuel flow passage 208 and exit the valve body 178 through an outlet opening 218. In this instance, the fuel flows through the end cap 186 to enter the valve passage 190. The fuel then enters the inlet opening 212 of the valve head passage 210 and exits the valve head passage 210 through the first plurality of openings 214. The fuel then exits the valve head passage 210 through the first plurality of openings 214 and enters a cavity 220 defined between the valve head 188 and the valve body 178. The fuel then exits the cavity 220 through the outlet opening 218. By moving the valve head 188 toward the fully closed position, the opening between the cavity 220 and the outlet opening 218 may become smaller until the opening between the cavity 220 and the outlet opening 218 is closed shutting off the fuel flow passage 208, as shown in FIG. 3B. The controller 120 may move the valve head 188 as described above to adjust the amount of fuel that travels out of the outlet opening 218 and toward the fuel rail 150.

The fuel may also pass through the second plurality of openings 216 to allow fuel to move from one side of the valve head 188 to the other side of the valve head 188 as the valve head 188 moves along the valve axis 191. The plurality of second openings 216 allows the fuel displaced by the movement of the valve head 188 to move through the valve head 188 to either side of the valve head 188. This process may allow the valve head 188 to move within the valve passage 190 without pressure increases in the fuel due to the movement. The fuel may fill the valve passage 190 all around the valve head 188. The fuel may also enter the internal channel 200 of the valve actuator and fill the internal channel 200 around the armature 198.

Overtime as the suction control valve 146 is operated and fuel passes through the suction control valve 146 debris deposits from the fuel may build up on the armature 198 and/or the valve head 188. The debris deposits may build up on the valve head 188 between the valve head 188 and the valve passage 190. For example, the debris deposits may build up on the surfaces of the valve head 188 that touch the wall of the valve passage 190 or at the edges where the surface of the valve head 188 touches the valve passage 190. Similarly, the debris deposits may build up on the armature 198 between the armature 198 and the internal channel 200. For example, the debris deposits may build up on the surface of the armature 198 that touch the wall of the internal channel 200 or at the edges of where the surface of the armature 198 touches the internal channel 200. The debris deposits generally build up in low clearance areas and add additional friction that needs to be overcome for the valve head 188 and/or armature 198 to move. For example, the debris deposit may be touching the valve head 188 and the valve passage 190 wall making it require more force for the valve head 188 to move within the valve passage 190. The additional friction may cause the controller 120 to control the suction control valve 146 less precisely.

Figure 4A:
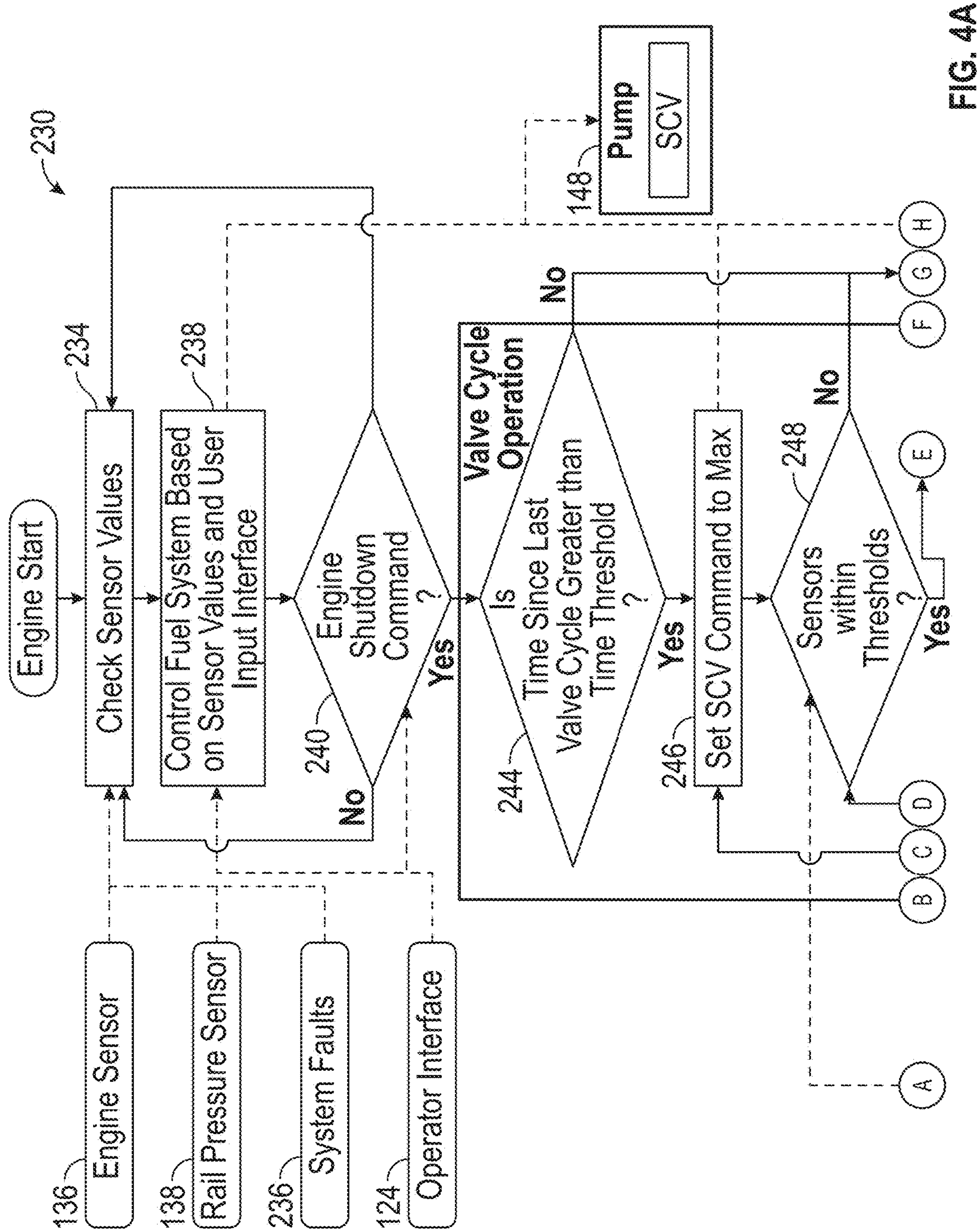
FIGS. 4A and 4B are an example method for operating the fuel system that includes a valve cycle operation to remove debris deposits from the suction control valve.
Figure 4B:
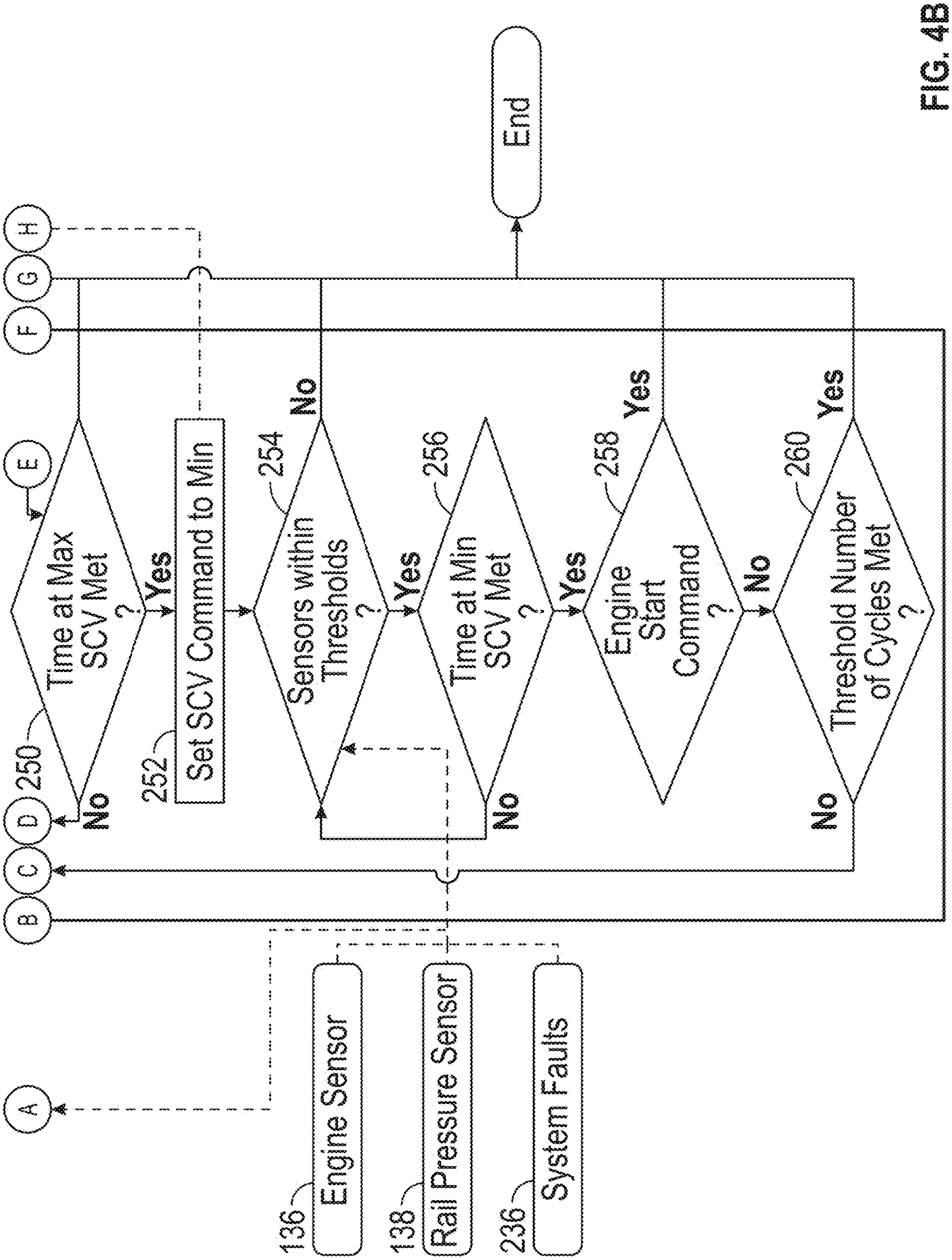

Referring to FIGS. 4A and 4B, a valve cycle operation 242 may be periodically performed to maintain the suction control valve 146 in optimal performance. This operation maintains optimal performance of the suction control valve 146 by removing debris deposit build up on the suction control valve 146. The method 230 has the work vehicle 110 operate normally and after a shutdown of the work vehicle the valve cycle operation 242 may be performed by the controller 120. The valve cycle operation 242 repeatedly cycles the suction control valve 146 from the fully open position to the fully closed position where the valve head is seated and then back to the fully open position. As such, the valve cycle operation 242 repeatedly moves the valve head 188 within the valve body 178 to seat and unseat the valve head 188. This repeated movement of the valve head 188 and armature 198 through their full range of motion helps to remove debris build up on the valve head 188 and armature 198. The cycle is repeated a threshold number of times to remove debris build up on the valve head 188 and the armature 198. When the work vehicle is operating, any loose debris that was broken free due to the valve cycle operation 242 may be moved further through the fuel through the fuel system 142 and deposited within the fuel rail 150 or injector filter 180. As such, the loose debris does not reach an injector 152.

The method 230 begins with the engine starting. The method 230 includes the controller 120 checking 234 the values of the sensors. The controller 120 receives data from the engine sensor 136 and the fuel rail pressure sensor 138. The controller 120 may also detect system faults 236 or receive system faults from various other systems communicably coupled to the controller 120. The engine sensor 136 provides the controller 120 with data regarding the speed, load, and/or temperature of the engine 140. The fuel rail pressure sensor 138 provides the controller with the current fuel pressure at the fuel rail 150. The system faults 236 may be determined by the controller 120 or received by the controller 120. The controller 120 compares the engine sensor data and fuel rail pressure to safety thresholds for the engine 140. If any of the safety thresholds are exceeded, then the controller 120 may perform an emergency shutdown of the engine 140. The controller 120 may detect a system fault 236 based on received sensor data. For example, the controller 120 may determine a system fault 236 based on the engine sensor data and/or the fuel rail pressure data exceeding a safety threshold. The controller 120 may also detect a system fault 236 by receiving system fault data from another system or controller of the work vehicle 110 communicably coupled to the controller 120. If a system fault 236 is detected, then the controller 120 may perform an emergency shutdown of the engine 140. If an emergency shutdown of the engine 140 is performed then the method 230 is ended. If all the sensor values are within the safety thresholds and there are no system faults 236, then the method 230 proceeds.

The method 230 includes the controller 120 controlling 238 the fuel system 142 based on the received sensor data and the operator interface 124. The controller 120 receives input data from the operator interface 124 regarding instructions for the work vehicle 110 from the operator. The controller 120 then operates the work vehicle based on the instruction from the operator and the received sensor data. For example, the operator engages an operation through the operator interface (e.g., pressing a brake of the operator interface 124) and the controller 120 performs that operation (e.g. engaging the brakes on the work vehicle 110). Throughout these normal operations the controller 120 operates the fuel system 142 appropriately to keep the engine 140 running properly. For example, the controller 120 assesses the rail pressure and the engine speed, load, or temperature relative to threshold values. Then the controller 120 operates the suction control valve 146 to seat or unseat the valve head 188 to initiate and sustain delivery of pressurized fuel from the fuel pump 148 to the fuel rail 150 at a normal operating pressure above 10,000 psi during these normal operations of the engine 140. The controller 120 may control the suction control valve 146 based on the assessment of the rail pressure and the engine speed, load, or temperature. The controller 120 may additionally control the suction control valve 146 based on the desired operation received from the operator interface 124. If at anytime a threshold is exceeded, then the controller 120 may perform an emergency shutdown of the engine 140. Otherwise, the controller 120 will continue to operate the engine 140 and work vehicle 110 based on the operator interface 124 and received sensor data until an engine shutdown is detected.

The method 500 includes the controller 120 detecting 240 if an engine shutdown command is received or detected. If the controller 120 receives an engine shutdown command from the operator interface 124 or detects an engine shutdown command, then the controller 120 will shut down the engine 140. The method 500 includes the controller 120 performing a valve cycle operation 242 after an engine shutdown command is performed.

The valve cycle operation 242 is performed by the controller 120 after an engine speed of the engine 140 is at or below a threshold speed value and the fuel pressure at the fuel rail 150 is at or below a threshold pressure. The valve cycle operation 242 is only performed when the parameters are met to ensure that there is no damage to the engine 140 from repeatedly cycling the suction control valve 146 through its full range of motion. For example, if the engine 140 were running normally and the suction control valve 146 was repeatedly opened fully and closed fully it could be possible to damage the engine 140 by supplying too much fuel or too little fuel through the suction control valve 146 at the wrong time.

In at least one aspect, the engine speed threshold is zero rotations per minute (RPM) and the pressure threshold is 50 MPa. If this aspect, the engine 140 has fully stopped running before the valve cycle operation 242 is performed. As such, there is no damage to the engine 140 by cycling the suction control valve 146. With the engine RPM being zero, then the feed pump 144 of the fuel pump 148 would not be pumping fuel through the suction control valve 146. For example, in this instance, fuel would not be pumped along the fuel flow passage 208 when the valve head 188 is unseated. In an alternative aspect, the engine speed threshold is 500 RPM and the pressure threshold is 50 MPa. If this aspect, the engine 140 is in the process of shutting down to a full stop and the valve cycle operation 242 is performed once the engine speed is slow enough and the rail pressure is low enough. In either case, the valve cycle operation 242 is performed in a subnormal operation of the engine 140. For example, as the engine 140 is shutting down or fully shutdown. In an alternative aspect, the valve cycle operation 242 may be performed before the engine is started instead of during/after an engine shutdown. In any case, the data from the engine sensor 136, fuel rail pressure sensor 138, and system faults 236 are monitored throughout the valve cycle operation 242 and the valve cycle operation 242 is ended if a threshold is exceeded or a system fault detected.

The valve cycle operation 242 includes the controller 120 detecting 244 if the time since the last valve cycle operation 242 is greater than a threshold time. If the time since the last valve cycle operation 242 is not greater than the threshold time, then the valve cycle operation 242 is stopped and the method 230 is ended. If the time since the last valve cycle operation 242 is greater than the threshold time, then the valve cycle operation 242 continues and moves on to the next step of the valve cycle operation 242. Checking the time since the last valve cycle operation 242 occurred and comparing it to a threshold helps prevent the valve cycle operation 242 from being performed every shutdown. For example, the valve cycle operation 242 may not be desired to be performed multiple times within an hour since there would most likely not be debris build up in such a short amount of time. Some example threshold times are 10 hours, 2 hours, 1 hour, 5 minutes. The threshold time may be any value of time. If the threshold time is set to zero then the valve cycle operation 242 is performed at every normal shutdown of the engine 140.

The next step of the valve cycle operation 242 includes the controller 120 setting 246 the suction control valve command to a maximum current value. The controller 120 transmits to the suction control valve 146 a maximum current value to have the armature 198 and valve head 188 move toward the fully closed position and to seat the valve head 188 against the valve body 178. In at least one aspect, the controller 120 supplies a maximum amount of current to the suction control valve 146 to power the coil 196 to move the armature 198 and valve head 188 overcome the spring biasing force and move to the fully closed position.

The next step of the valve cycle operation 242 includes the controller 120 determining 248 if the sensor data is within corresponding thresholds or if a system fault is detected. Similar to earlier in the method 230, the engine sensor 136 provides the controller 120 with data regarding the speed, load, and/or temperature of the engine 140, the fuel rail pressure sensor 138 provides the controller 120 with the current fuel pressure at the fuel rail 150, and the system faults 236 may be determined by the controller 120 or received by the controller 120. The controller 120 compares the data received to the engine data threshold and the pressure rail threshold. In at least one aspect, the engine data threshold is an engine speed threshold of zero RPM and the pressure rail threshold is 50 MPa. In an alternative aspect, the engine data threshold is an engine speed threshold of 500 RPM and the pressure rail threshold is 50 MPa. If the controller 120 detects a system fault or the sensor data exceeds a threshold, then the valve cycle operation 242 is stopped and the method 230 is ended. If the valve cycle operation 242 is stopped, then the controller 120 stops sending the suction control valve command at maximum current and instead sends zero current. If there are no system faults detected and the sensor values are within the thresholds, then the valve cycle operation 242 continues to the next step.

The next step of the valve cycle operation 242 includes the controller 120 determining 250 if the time the suction control valve command has been set to the maximum value is greater than a threshold time period. The threshold time period provides the suction control valve 146 with enough time for the suction control valve 146 to reach the fully closed position. In at least one aspect, the threshold time period is 80 ms. If the time the suction control valve command has been set to the maximum value is not greater than the threshold time period, then the valve cycle operation 242 has the controller 120 go back to perform step 248 to monitor the sensor data and system faults 236 while waiting for the time to exceed the threshold time period. Once the time the suction control valve command has been set to the maximum value is greater than the threshold time period, then the valve cycle operation 242 proceeds to the next step.

The next step of the valve cycle operation 242 includes the controller 120 setting 252 the suction control valve command to a minimum current value. The controller 120 transmits to the suction control valve 146 a minimum current value to have the armature 198 and valve head 188 move toward the fully open position. In at least one aspect, the controller 120 supplies zero current to the suction control valve 146. In this aspect, the coil 196 stops being supplied current and the spring 182 moves the valve head 188 and armature 198 toward the fully open position. For example, the spring 182 may unseat the valve head 188 and move the valve head 188 toward the fully open position.

The next step of the valve cycle operation 242 includes the controller 120 determining 254 if the sensor data is within corresponding thresholds or if a system fault is detected. This step 254 is performed by the controller the same as step 248 using the same thresholds as in step 248. The controller 120 compares the data received to an engine data threshold and a pressure rail threshold. If the controller 120 detects a system fault or the sensor data exceeds a threshold, then the valve cycle operation 242 is stopped and the method 230 is ended. If there are no system faults detected and the sensor values are within the thresholds, then the valve cycle operation 242 continues to the next step.

The next step of the valve cycle operation 242 includes the controller 120 determining 256 if the time the suction control valve command has been set to the minimum value is greater than a threshold time period. The threshold time period provides the suction control valve 146 with enough time for the suction control valve 146 to reach the fully open position. In at least one aspect, the threshold time period is 120 ms. If the time the suction control valve command has been set to the minimum value is not greater than the threshold time period, then the valve cycle operation 242 has the controller 120 go back to perform step 254 to monitor the sensor data and system faults 236 while waiting for the time to exceed the threshold time period. Once the time the suction control valve command has been set to the minimum value is greater than the threshold time period, then the valve cycle operation 242 proceeds to the next step.

The next step of the valve cycle operation 242 includes the controller 120 determining 258 if an engine start command is detected or received. For example, the operator may quickly after shutting down the engine start the engine again. If a start engine command is detected or received by the controller 120 (e.g., a start command from the operator interface 124), then the valve cycle operation 242 is stopped and the method 230 is ended. If a start engine command is not detected or received by the controller 120, then the valve cycle operation 242 proceeds to the next step.

The next step of the valve cycle operation 242 includes the controller 120 determining 260 if the suction control valve 146 has been fully opened and fully closed a threshold number times. Each cycle of the suction control valve 146 being fully open, fully closed, and then fully open again may be tracked by the controller 120. In at least one aspect, the threshold number of cycles is 15. For example, if the suction control valve 146 is cycled from fully open to fully closed the threshold number of times, then some of the debris build up on the suction control valve 146 will be broken loose. If the suction control valve 146 has not been fully opened and fully closed the threshold number times, then valve cycle operation 242 continues back to step 246 and the controller 120 sets the suction control value command to the maximum current value. If the suction control valve 146 has been fully opened and fully closed the threshold number times, then valve cycle operation 242 ends and the method 230 ends.

Each cycle of opening and closing the suction control valve takes approximately 0.2 seconds. The valve cycle operation 242 performs this cycling 15 times for a total of approximately 3 seconds. As such, the valve cycle operation 242 may be performed in less than 5 seconds. Performing the valve cycle operation 242 quickly at the end of each shutdown for the engine 140 may keep the suction control valve 146 operating in optimal condition. The valve cycle operation 242 may be performed quickly enough that it is not a burden to be performed at each engine 140 shutdown.

Figure 5:
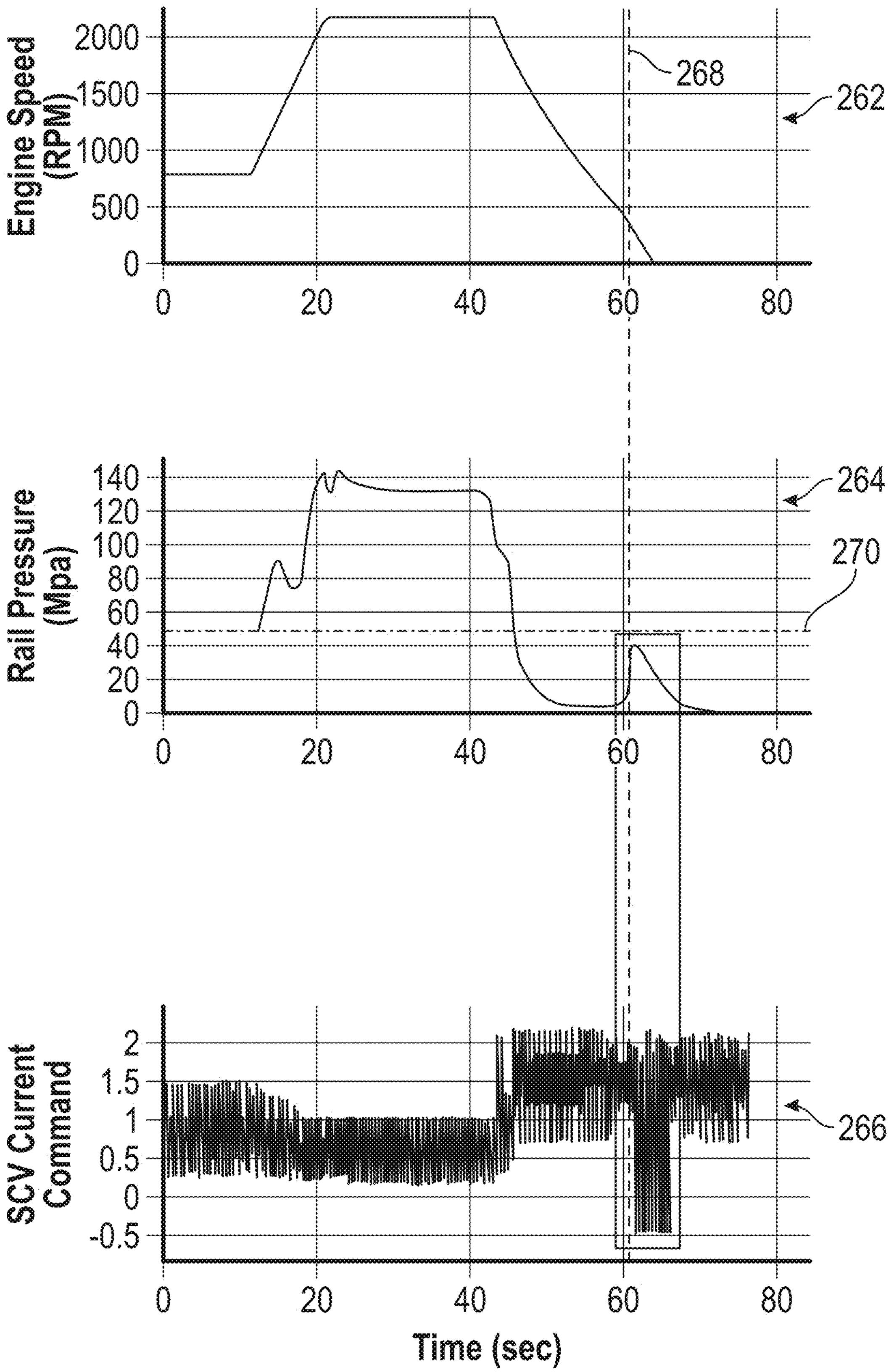
FIG. 5 is a set of plots illustrating engine parameters during operation of the work vehicle and a valve cycle operation during a shutdown of the work vehicle.

Referring to FIG. 5, the plot 262 illustrates an example of engine RPM over time for the work vehicle 110. The plot 264 illustrates an example of pressure at the fuel rail 150 over time for the work vehicle 110. The plot 266 illustrates an example SCV current command over time for the work vehicle 110. The plots 262, 264, 266 show the work vehicle 110 operating normally and during shutdown of the engine 140 an example valve cycle operation 242 was performed. The valve cycle operation 242 began at approximately 60 seconds marked by reference line 268. For this example valve cycle operation 242, the engine speed threshold was 500 RPM and the rail pressure threshold was 50 MPa. The valve cycle operation 242 began during the engine shutdown after the engine speed was below 500 RPM and the rail pressure threshold was below 50 MPa. During the valve cycle operation 242 the suction control valve command was cycled to quickly open and close the suction control valve. It is seen in plot 262 and plot 264 that the engine speed did not increase to above 500 RPM and the rail pressure did not increase to above 50 MPa. The reference line 270 marks 50 MPa on the plot 264 for reference.

Figure 6A:
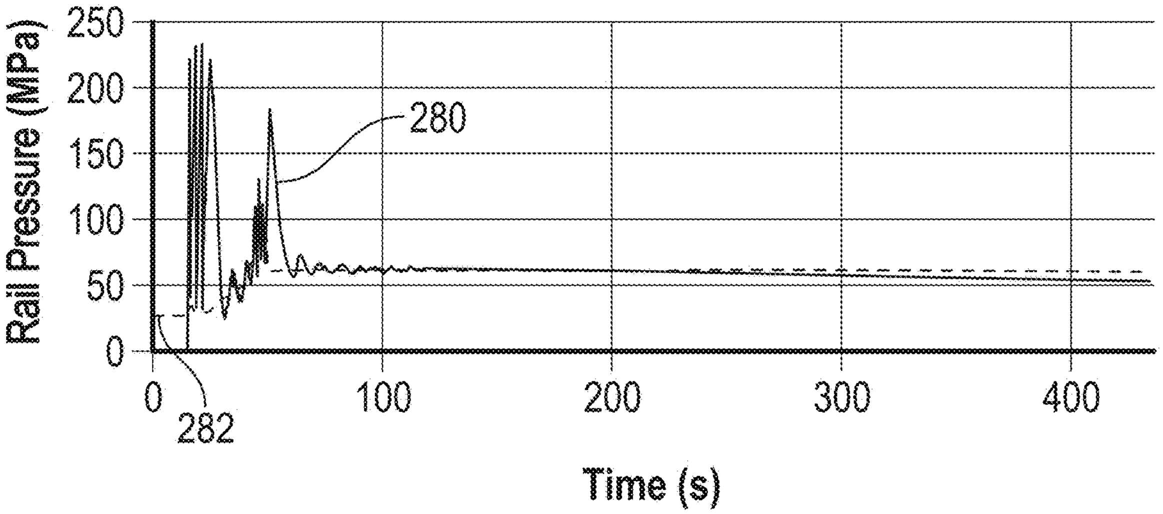
FIGS. 6A and 6B are plots illustrating a rail pressure of the fuel system before and after debris build up on the suction control valve is cleared due to the valve cycling operation.
Figure 6B:
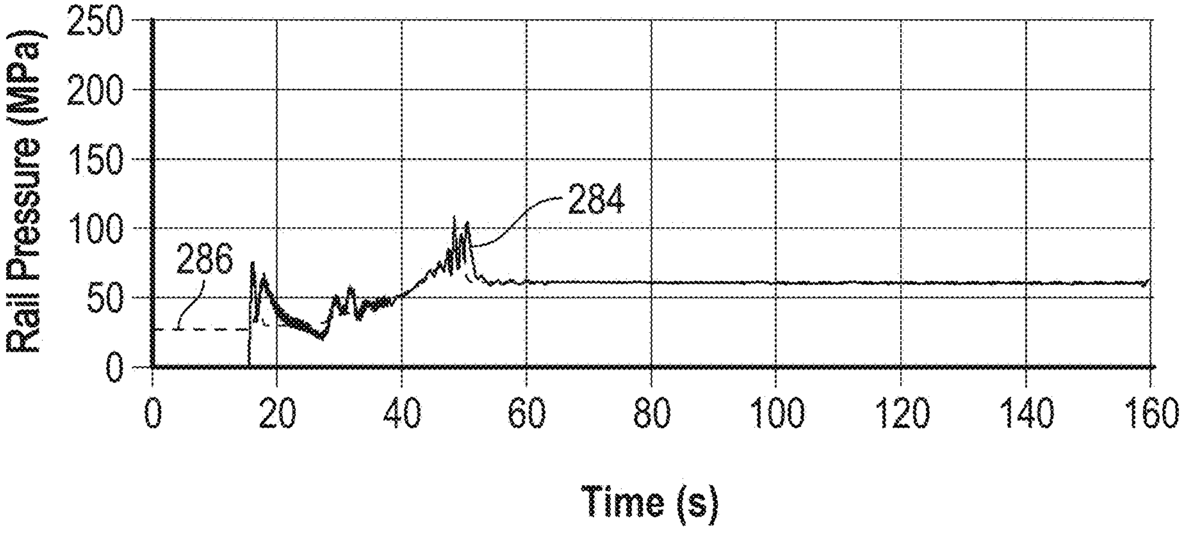
Figure 7A:
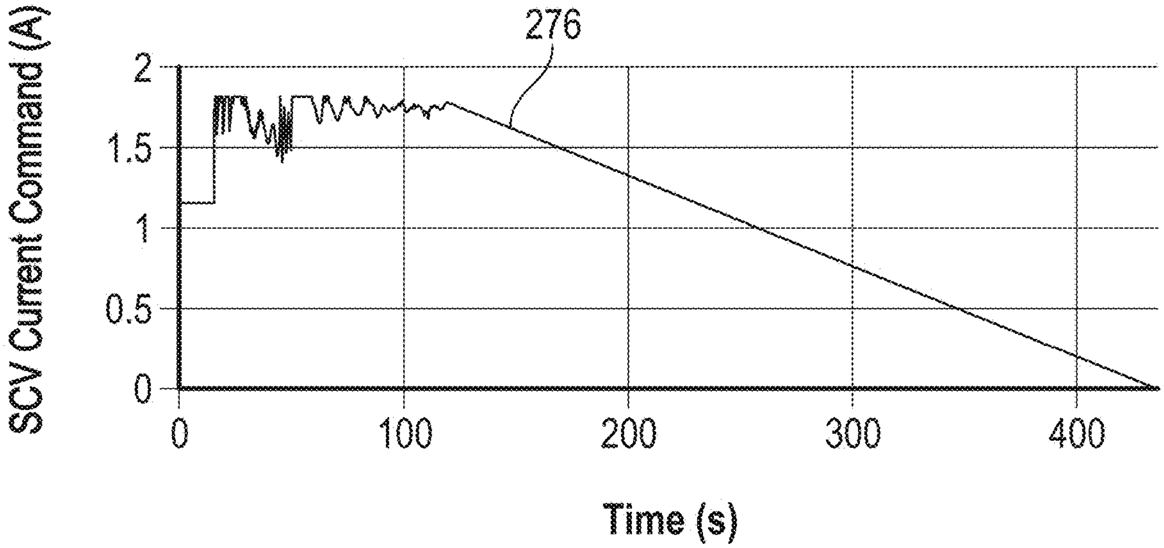
FIGS. 7A and 7B are plots illustrating the suction control valve command before and after debris build up on the suction control valve is cleared due to the valve cycling operation.
Figure 7B:
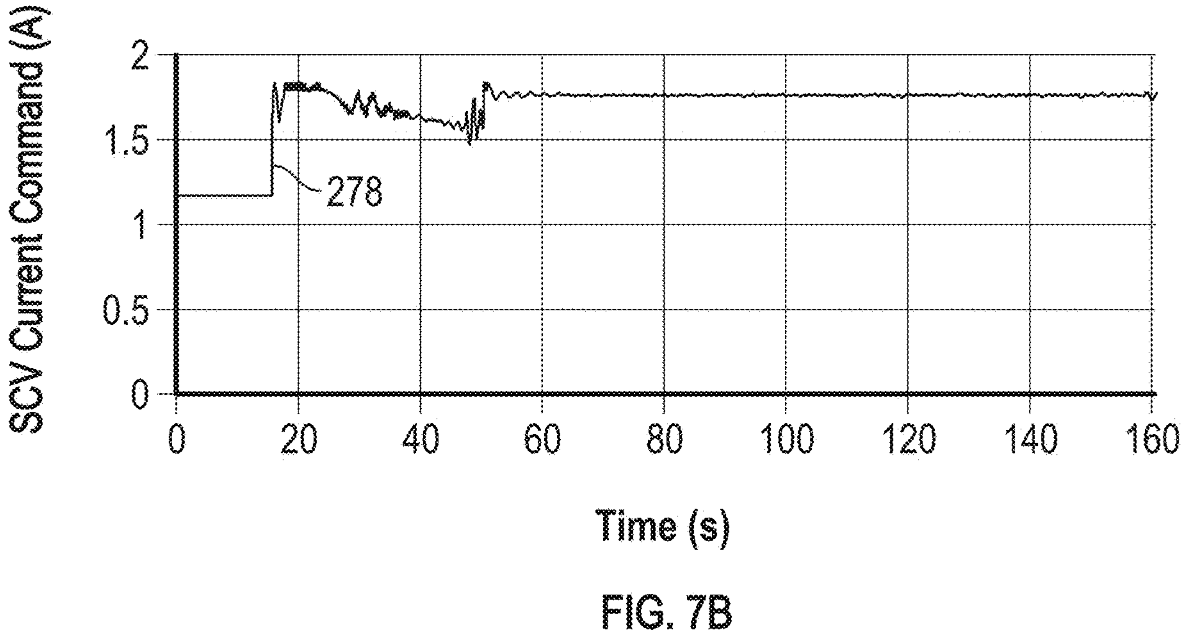

FIGS. 6A and 7A show the rail pressure 280 and suction control valve command 276, respectively, for a work vehicle 110 with debris build up in the suction control valve 146. FIGS. 6B and 7B show the rail pressure 284 and suction control valve command 278, respectively, for the same work vehicle 110 as in FIGS. 6A and 7A after performing the valve cycling operation 242. FIG. 6A shows the rail pressure 280 exceeding 200 MPa and the rail pressure 280 being erratic compared to the desired rail pressure 282. The rail pressure 280 not being able to closely follow the desired rail pressure 282 is due to poor control of the suction control valve due to debris build up within the suction control valve 146. FIG. 6B shows how the rail pressure 286 has a maximum near 100 MPa after the valve cycling operation 242. The rail pressure 284 follows more closely to the desired rail pressure 286 than the rail pressure 280 and desired rail pressure 282. The rail pressure 284 following more closely to the desired rail pressure 286 is an effect of the suction control valve 146 being better controlled due to removal of debris build up. The desired rail pressures 282, 286 are the same.

The suction control valve command 276 of FIG. 7A is used by the controller 120 to control the rail pressure 280 of FIG. 6A. The suction control valve command 278 of FIG. 7B is used by the controller 120 to control the rail pressure 284 of FIG. 6B. The beginnings of the suction control valve commands 276, 278 are similar in the beginning but overtime drift greatly apart from each other.

In FIG. 7A, the controller 120 tries to increase pump flow by reducing the suction control valve command 276, but as shown in FIG. 6A even by significantly reducing current the fuel pressure does not build. For example, the suction control valve command 276 begins linearly getting smaller starting around 2.6 seconds and becomes much smaller than the suction control valve command 278. The suction control valve command 276 decreases linearly to maintain a constant desired rail pressure 282 and potentially build pressure; however, as shown in FIG. 6A the fuel pressure is linearly dropping below the desired rail pressure 282. This is indicative of the suction control valve 146 not smoothly moving based on the suction control valve command 276.

In FIG. 7B, the suction control valve command 278 has a profile that varies less than the control valve command 276 once the rail pressure 284 reaches the desired rail pressure 286. The suction control valve command 276 varying less and staying relatively constant to maintain a constant desired rail pressure 286 is indicative of the suction control valve 146 moving smoothly. As such, FIGS. 6A-7B show how the suction control valve 146 initially had debris build up and moved more smoothly with better control after the valve cycle operation 242 was performed.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Although portions of the disclosure may use the phrase "at least one" or "one or more" of a particular component or element, unless otherwise specifically limited, the mere recitation of a single element or component does not preclude a plurality of such elements or components.

What is claimed is:

1. A fuel system for an engine of a work vehicle, the fuel system comprising:

- a fuel rail to which are coupled fuel injectors that are in turn coupled to the engine;
- a fuel pump delivering pressurized fuel to the fuel rail to be distributed to the fuel injectors;
- a sensor arrangement including a pressure sensor detecting a rail pressure at the fuel rail and an engine sensor detecting a speed, load, or temperature of the engine;
- a control valve configured to control flow through the fuel pump, the control valve having:
  - a valve body defining a flow passage upstream from the fuel rail and the pressurized fuel and leading from a valve passage that is disposed about a valve axis in which is disposed a valve head, the valve head configured to seat against the valve body to close off the flow passage; and
  - a valve actuator coupled to the valve body and controllable to move the valve head along the valve axis to seat or unseat the valve head; and
- a controller coupled to the sensor arrangement and the control valve and having processing and memory architecture executing logic commands to control the control valve to:
  - assess the rail pressure and the engine speed, load, or temperature relative to threshold values;
  - operate the control valve to seat or unseat the valve head of the control valve to initiate and sustain delivery of the pressurized fuel from the fuel pump to the fuel rail at a normal operating pressure above 10,000 psi during a normal operation of the engine as determined by the controller based on the assessment of the rail pressure and the engine speed, load, or temperature;
  - determine a subnormal engine operation condition based on the pressure sensor or the engine sensor or receipt of an engine shutdown command;
  - after determining a subnormal engine operation condition, cycle the control valve to repeatedly seat and unseat the valve head in succession;
  - determine an engine start condition based on the pressure sensor or the engine sensor or receipt of an engine start command; and
  - after determining an engine start condition, terminate cycling the control valve.

2. The fuel system of claim 1, wherein cycling the control valve to repeatedly seat and unseat the valve head comprises repeatedly cycling the valve head through its full range of motion.

3. The fuel system of claim 2, wherein the valve head is cycled through its full range of motion a threshold number of times.

4. The fuel system of claim 1, wherein the control valve actively seats the valve head against the valve body to close off the flow passage and passively unseats the valve head to open flow passage through the valve body.

5. The fuel system of claim 1, wherein the control valve comprises a spring positioned against the valve head, wherein the spring applies a biasing force to the valve head to unseat the valve head, and wherein the valve actuator overcomes the biasing force to seat the valve head and close off the flow passage.

6. The fuel system of claim 5, wherein the valve actuator comprises a solenoid comprising an armature, wherein the armature is movable from a first position to a second position, wherein moving from the first position to the second positioned causes the armature to press against the valve head, and wherein, in the second position, the armature moved the valve head to seat the valve head, and wherein positioning the armature in the first position allows the spring to move the valve head and unseat the valve head.

7. The fuel system of claim 1, wherein cycling the control valve to repeatedly seat and unseat the valve head comprises:

- supplying a maximum current to the valve actuator for a first threshold time period, wherein the valve head is moved to seat the valve head during the first threshold time period; and
- supplying a minimum current to the valve actuator for a second threshold time period, wherein the valve head is moved to unseat the valve head during the second threshold time period.

8. The fuel system of claim 1, wherein cycling the control valve to repeatedly move the valve head within the valve body to seat and unseat the valve head is configured to remove debris built up on the valve head.

9. The fuel system of claim 1, wherein debris removed from within the control valve is deposited within the fuel system before reaching the injectors.

10. The fuel system of claim 1, wherein the thresholds comprise an engine speed threshold of zero.

11. An engine of a work vehicle, the engine comprising:

- a plurality of fuel injectors;
  - a fuel rail coupled to the plurality of fuel injectors;
  - a fuel pump delivering pressurized fuel to the fuel rail to be distributed to the fuel injectors;
  - a sensor arrangement including a pressure sensor detecting a rail pressure at the fuel rail and an engine sensor detecting a speed, load, or temperature of the engine;
  - a control valve configured to control flow through the fuel pump, the control valve having:
  - a valve body defining a flow passage upstream from the fuel rail and the pressurized fuel and leading from a valve passage that is disposed about a valve axis in which is disposed a valve head, the valve head configured to seat against the valve body to close off the flow passage; and a valve actuator coupled to the valve body and controllable to move the valve head along the valve axis to seat or unseat the valve head; and a controller coupled to the sensor arrangement and the control valve and having processing and memory architecture executing logic commands to control the control valve to:

assess the rail pressure and the engine speed, load, or temperature relative to threshold values;

operate the control valve to seat or unseat the valve head of the control valve to initiate and sustain delivery of the pressurized fuel from the fuel pump to the fuel rail at a normal operating pressure above 10,000 psi during a normal operation of the engine as determined by the controller based on the assessment of the rail pressure and the engine speed, load, or temperature;

determine a subnormal engine operation condition based on the pressure sensor or the engine sensor or receipt of an engine shutdown command;

after determining a subnormal engine operation condition, cycle the control valve to repeatedly seat and unseat the valve head in succession;

determine an engine start condition based on the pressure sensor or the engine sensor or receipt of an engine start command; and after determining an engine start condition, terminate cycling the control valve.

12. The engine of claim 11, wherein cycling the control valve to repeatedly seat and unseat the valve head comprises repeatedly cycling the valve head through its full range of motion.

13. The engine of claim 12, wherein the valve head is cycled through its full range of motion a threshold number of times.

14. The engine of claim 11, wherein the control valve actively seats the valve head against the valve body to close off the flow passage and passively unseats the valve head to open flow passage through the valve body.

15. The engine of claim 11, wherein the control valve comprises a spring positioned against the valve head, wherein the spring applies a biasing force to the valve head to unseat the valve head, and wherein the valve actuator overcomes the biasing force to seat the valve head and close off the flow passage.

16. The engine of claim 15, wherein the valve actuator comprises a solenoid comprising an armature, wherein the armature is movable from a first position to a second position, wherein moving from the first position to the second positioned causes the armature to press against the valve head, and wherein, in the second position, the armature moved the valve head to seat the valve head, and wherein positioning the armature in the first position allows the spring to move the valve head and unseat the valve head.

17. The engine of claim 11, wherein cycling the control valve to repeatedly seat and unseat the valve head comprises:

supplying a maximum current to the valve actuator for a first threshold time period, wherein the valve head is moved to seat the valve head during the first threshold time period; and supplying a minimum current to the valve actuator for a second threshold time period, wherein the valve head is moved to unseat the valve head during the second threshold time period.

18. The engine of claim 11, wherein cycling the control valve to repeatedly move the valve head within the valve body to seat and unseat the valve head is configured to remove debris built up on the valve head.

19. The engine of claim 11, wherein debris removed from within the control valve is deposited within the fuel rail before reaching the injectors.

20. The engine of claim 11, wherein the thresholds comprise an engine speed threshold of zero.

* * * * *